United States Patent
Takizawa et al.

[11] Patent Number: 5,130,622
[45] Date of Patent: Jul. 14, 1992

[54] METHOD AND DEVICE FOR CONTROLLING SIDE SUPPORT IN A POWERED SEAT

[75] Inventors: Kiyotaka Takizawa; Hiromitsu Ogasawara, both of Akishima, Japan

[73] Assignee: Tachi-S Co., Ltd., Akishima, Japan

[21] Appl. No.: 686,163

[22] Filed: Apr. 16, 1991

[51] Int. Cl.$^5$ .............................................. A47C 7/40
[52] U.S. Cl. ..................... 318/265; 318/266; 318/286; 318/468; 318/469
[58] Field of Search ............... 318/256, 257, 264, 265, 318/266, 268, 272, 280, 283, 285, 286, 446, 452, 466, 467, 468, 470, 484, 489; 307/9.1, 10.1

[56] References Cited
U.S. PATENT DOCUMENTS 4,885,513 12/1989 Sakamoto et al. .................. 318/468
4,924,162 5/1990 Sakamoto et al. .................. 318/466
4,924,163 5/1990 Sakamoto et al. .................. 318/569

*Primary Examiner*—Bentsu Ro
*Attorney, Agent, or Firm*—Oldham, Oldham & Wilson Company

[57] ABSTRACT

Method and device for controlling a side support in a powered seat, in which the side support device is controlled in its opening/closing motion in order that it is not moved repeatedly sensitive to each of acceleration being applied to the seat during driving on a curved road, by virtue of a standard checking process for determining an excessive acceleration, and then a short and long hold time system for holding the side support device in unmoved state against repeated or plural intermittent occurrences of accelerations being applied to the seat.

12 Claims, 6 Drawing Sheets

5,130,622

METHOD AND DEVICE FOR CONTROLLING SIDE SUPPORT IN A POWERED SEAT

BACKGROUND OF THE INVENTION

1. Field of the Invention

The present invention relates to a powered seat in automobile, and particularly to a method and device for controlling a side support in the powered seat in order to support both sides of an occupant on the seat.

2. Description of Prior Art

Conventionally, there has been available a side support device for supporting both sides of an occupant to prevent him or her against lateral dislocation from a proper seating posture, which has been installed in a driver's seat of an automobile.

The hitherto side support device includes a pair of side support members at the respective lateral sides of a seat back. The side support members at arranged such as to applying a pressure to an upper body part of the occupant on the seat, thereby forcibly restricting the movements of occupant's upper body part.

Use of this side support members to keep pressing both sides of the occupant has been found defective in that the occupant's upper body part can not be moved freely as desired, as a result of which, the occupant becomes unpleasant on such seat and further he or she can not easily get on and out of the automobile. The occupant suffers from an uncomfortable seating and fatigue develops from the restricted seating state. For this reason, normally the side support members are located widely away from each other to provide a free zone to the occupant: Namely, they are located at an open position, and only if the circumstances require the closing of the side support members, an automatic system is effected to cause the drive of a motor to move the side support members to each other at a side support position.

The method for controlling such motion of side support members, for example, is such that a parameter is set for degrees of lateral acceleration and a a standard degree thereof is set for detection of excessive lateral acceleration, and that if the excessive lateral acceleration is detected, the motor is driven to cause the side support members to move to the side support position. For instance, if the lateral acceleration, during driving on a curved road, is applied to the seat at an excessive degree over the standard one, the side support members are automatically moved to the side support position to support the occupant's upper body part. Therefore, the occupant is prevented against undesired dislocation on the seat, and he or she can retain a safe seating.

Such arrangement includes a return of side support members to the open position, which is carried out when the lateral acceleration is lowered below the standard degree and after lapse of a given hold time. However, this automatic opening and closing system of side support members is found defective in that, for instance, when the automobile runs on a winding road in mountainous area, each time of an excessive lateral acceleration is detected, the side support members are moved repeatedly to the side support position, while being returned to the open position each time that the automobile exits the curved parts of road. As a result, such repeated closing and opening of side support members gives an annoying feeling to the occupant and results in making him or her nervous.

SUMMARY OF THE INVENTION

In view of the shortcomings above, it is a purpose of the present invention to provide method and device for controlling a side support, which avoids repeated opening and closing of its side support members, so as not to give any unpleasant psychological state to an occupant on the seat.

In order to achieve that purpose, according to the present invention, it is arranged such that a lateral acceleration applied to the seat is checked through a determination as to whether the acceleration exceeds a standard acceleration degree or not, and further as to whether the acceleration lasts over a standard time.

Thus, the lateral acceleration being applied to the vehicle is not inadvertently detected until it exceeds certain standard conditions, whereby the support applied to both sides of occupant does not occur frequently, not making him or her nervous with such frequent motions of side support.

Additionally, the present invention is of such arrangement that there is provided a hold time for holding the side support in an unmoved state until a certain time elapses, and such hold time is divided into a short hold time and a long hold time. According thereto, after the acceleration has been detected to exceed over the foregoing standards, as a first step, if it is a single occurrence of acceleration, the short hold time is automatically selected, and the side support device is retained in an unmoved state for a short period of time, thereby preventing repeated motions of side support against plural slight lateral accelerations, normally. On the other hand, if multiple intermittent occurrences of acceleration are applied to the seat, after they have been detected to exceed over the foregoing standards, the short hold time is changed into a long hold time, so that the side support time is held unmoved for a long period, to thereby wait for a second occurrence of excessive acceleration to happen within a certain, given time, and if so, the side support is held unmoved against multiple intermittent occurrences of acceleration. In this way, the side support is not easily moved so that the occupant feels easy with the support on his or her both sides.

DETAILED DESCRIPTION OF PREFERRED EMBODIMENT OF THE INVENTION

Figure 1:
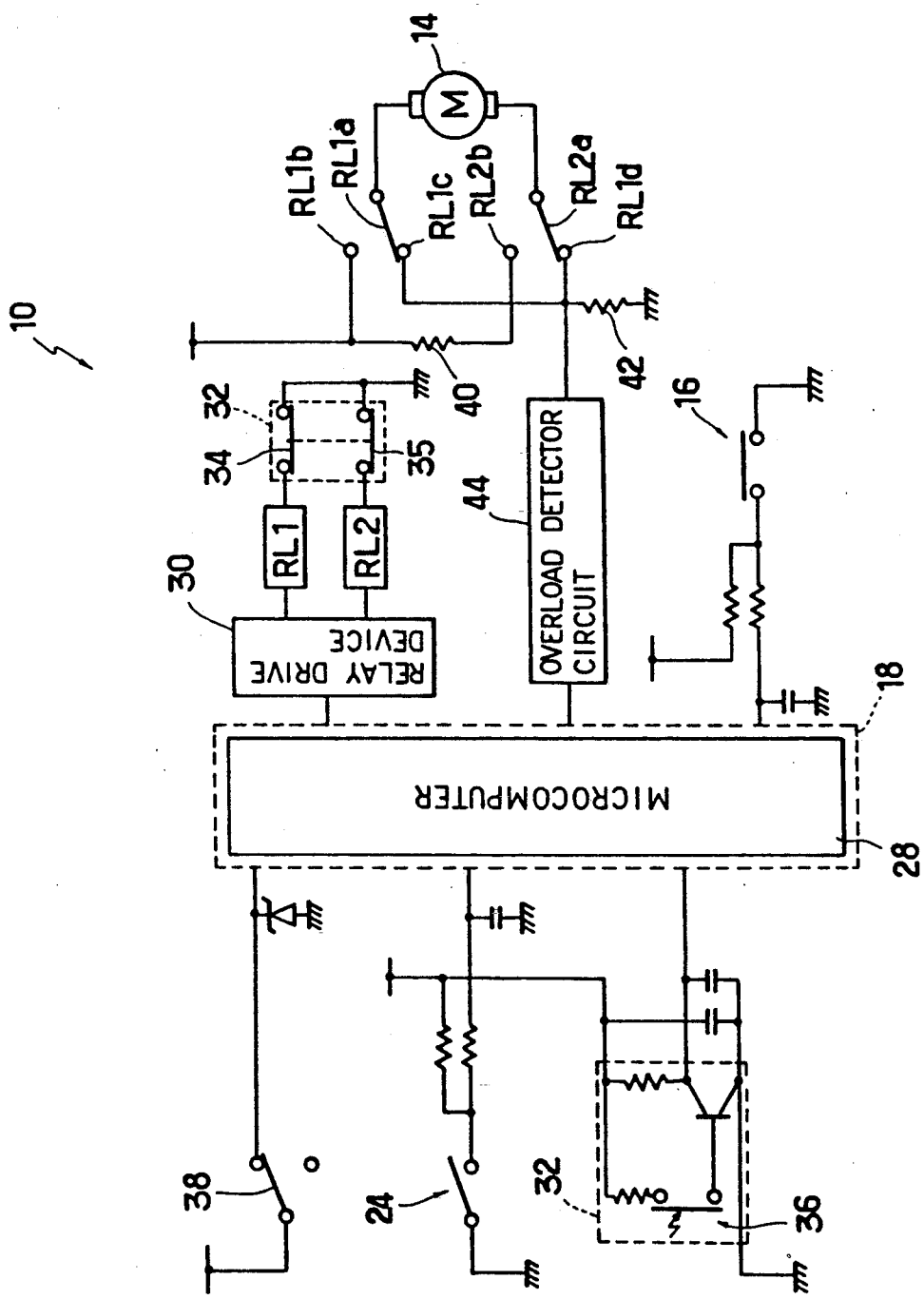
FIG. 1 is a block diagram of side support control device in a powered seat in accordance with the present invention.
Figure 2:
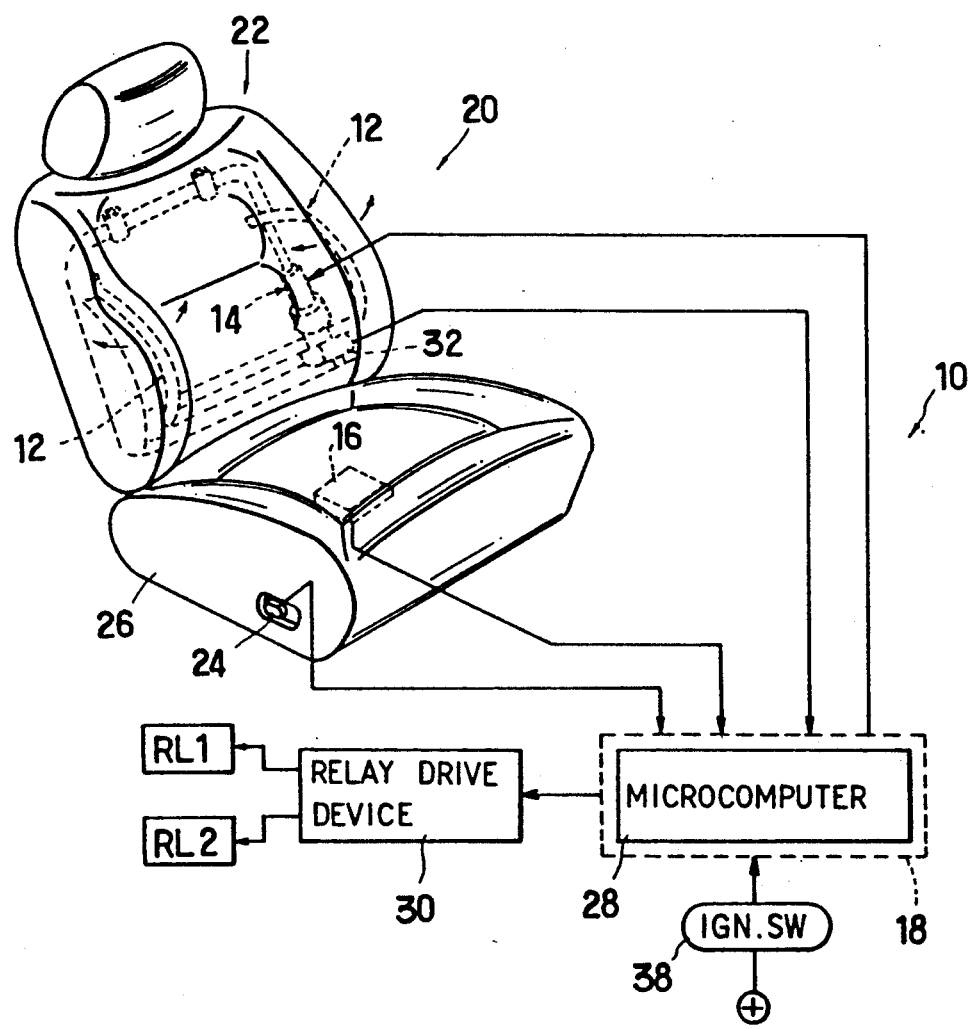
FIG. 2 is a schematic view showing the state wherein the device is applied to a seat.

Referring to FIGS. 1 and 2, there is shown a side support control device (10) in a powered seat in accordance with the present invention.

The control device (10) basically comprises a pair of side support members (12)(12), a motor (14), a lateral acceleration detector (16), relays (30, RL1, RL2), a position detector (32), RL1a, RL2a) and a central processing unit to be referred to as "CPU".

The motor (14) is preferably a DC geared motor, and provided with a drive mechanism for causing movement of the two side support members (12)(12), although not shown. As shown in FIG. 1, the motor (14) is connected electrically with a battery via the relay contacts (RL1a, RL2a). Such drive mechanism is prior art and a description thereon is omitted.

Figure 3:
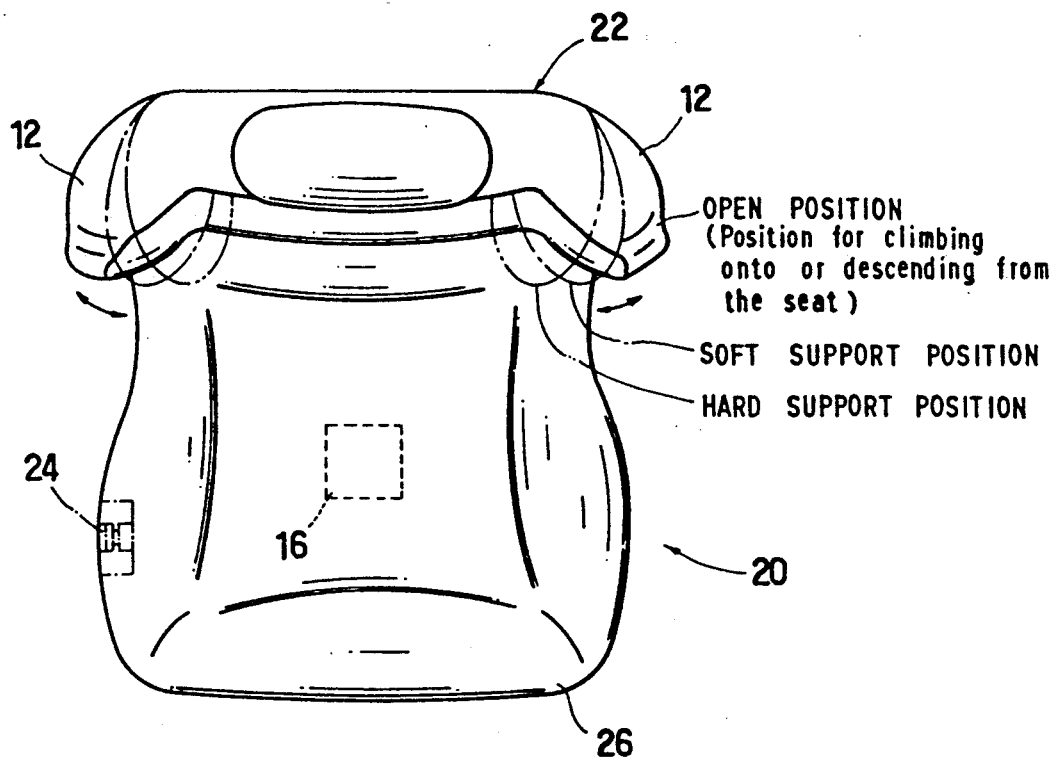
FIG. 3 is a schematic plan view of the seat in in FIG. 2.

The two side support members (12)(12) are disposed in the respective lateral sides of a seat back (22) of a seat (20), and are caused by the motor (14) to be moved between a side support position and an open position. As shown in FIG. 3, the side support position refers to a position where the side support members (12)(12) are moved toward each other to support both sides of an occupant (not shown) on the seat, whereas the open position refers to a position where the side support members (12)(12) are moved away from each other to release the occupant from such side supporting state of the members (12)(12), thus allowing the occupant to descend from or climb onto the seat (20). Normally, the side support members (12)(12) are set at the open position.

It is defined hereby, with reference to FIG. 3, that the side support position is divided into two support positions: A soft support position where the side support members (12)(12) are moved at a given step from the open position, and a hard support position where they are further moved at a second step from the soft support position, much closer toward each other.

At the soft support position, a pressure force is applied at a moderate degree, not so great, from the side support members (12)(12) against both sides of the upper body part of the occupant, which is suited for driving the automobile on a normal curved road in a city area.

At the hard support position, a pressure force is applied at a greater degree from the members (12) (12) to strongly support the upper body part of the occupant, which is suited for driving on a winding road with many curved parts in a mountainous area.

The selection switch (24) is for selectively causing the closing of the side support members (12) to either the soft support position or the hard support position. As in FIG. 1, the switch (24) is preferably a push-type switch which is capable of switching over between the soft and hard modes corresponding to the soft and hard support positions, and connected with the CPU (18). Turning on the switch (24) selects the soft mode, and turning off the same selects the hard mode. FIG. 2 depicts the selection switch (24) which is disposed at the lateral wall of a seat cushion (26).

The lateral acceleration detector (16), which detects an excessive degree of a lateral acceleration applied to the seat (20) in a direction laterally thereof, is electrically connected with the CPU (18). Preferably, the detector (16) is a mercury switch arranged to sense an inclination of the seat (20) when a lateral acceleration is applied, and located at the bottom of seat cushion (26) for best sensitivity to the inclination degree of seat (20).

This lateral acceleration detector (16) is in an "off" state during driving a flat road or normal curved road, where the lateral acceleration is applied below the standard degree, or in an "on" state during a greatly curved road where the lateral acceleration is applied above the standard degree. Preferably, the standard degree of lateral accelaration is approx. 0.25 G in terms of gravity.

Thus, when driving the automobile on a curved road, exertion of lateral acceleration over 0.25 G upon the seat (20) causes the inclination sensitive switch (16) to be turned "on", which sends a detection signal to the CPU (18).

The CPU (18) includes a microcomputer (28) which processes data according to a program which will be explained later, referring to FIGS. 4, 5 and 6, and outputs proper control signals. As can be seen from FIGS. 1 and 2, the control signals are output from the microcomputer (28) to a relay drive device (30) which in turns energizes either a first relay (RL1) or a second relay (RL2). Then, one of the two relays (RL1)(RL2), which is thus energized, is actuated to switch over the respective relay contact (RL1a or RL2a), to thereby control drive of the motor (14).

It is noted that the CPU (16) is programmed as to activate the relay drive device (30) only when the detection signal from the inclination sensitive switch (16) is input to the CPU (16) over a given standard time. Namely, it should be arranged that even if a lateral acceleration in excess of the foregoing standard degree is applied to the seat (20), the insufficiency of the time, not reaching the standard time, during which such detection signal from the switch (16) is input to CPU (16), will defer CPU instruction to activate the relay drive device (30) and thus keep the motor (14) in a stopped state. Preferably, the standard time may be approx. 0.1 sec.

Let it be assumed now that, with the side support members (12)(12) at the open position, a lateral acceleration over the standard degree, 0.25 G, is applied to the seat (20), and the detection signal from the inclination sensitive switch (16) continues to be input to the CPU (16) over the standard time, 0.1 sec. Then, the CPU (16) is permitted to send an instruction signal to the relay drive device (30), thereby activating the same, to energize the relay (RL1) to switch over the corresponding relay contact (RL1a) so as to drive the motor (14) in a normal direction. This normal drive of motor (14) causes movement of the side support members (12)(12) toward either the soft support position or the hard support position, from the open position.

According to the present invention, the CPU (16) is so programmed to maintain the side support members (12)(12) at one of the foregoing side support positions for a short time, as a hold time. Namely, it is so arranged that, with the side support members (12)(12) at the soft or hard support position, when the lateral acceleration turns to a lower degree below the standard degree, the side support members (12) (12) remain located at such soft or hard support position for a given hold time (a short time); in other words, the support members (12)(12) are held at that position for a little while, and after lapse of such hold time, the CPU (16) permits instructing the motor (14) to be driven in a reverse direction, through the relays (30, RL1, RL2, RL1a, RL2a), with the result that the side support members (12)(12) are moved away from each other, returning to the support position. The hold time is approx. 4 sec., preferably.

In this context, further, the arrangement in the present invention includes a system for discriminating a single occurrence of lateral acceleration from an intermittent series of repeated lateral accelerations, in case of both accelerations exceeding over 0.25 G and lasting over 0.1 sec. as above. Namely, if a lateral acceleration, which exceeds over the standard degree and lasts over the standard time, occurs twice or more intermittently, the CPU (16) determines whether a second occurrence of lateral acceleration happens within 20 sec., or not, and then if yes, changes the hold time from 4 sec. to 60 sec. Therefore, the hold time for holding the side support members (12)(12) is extended if the excessive lateral acceleration occurs twice or more, to prevent opening of the side support members (12)(12), considering the next occurrence of similar lateral acceleration.

The position detector (32) detects the open position, of either the soft or hard support positions, of the side support members (12)(12), so as to cause stop of the motor (14) for setting one of those positions. As shown in FIG. 1, the position detector (32) comprises a set of first and second limit switches (34)(35) and a position switch (36). The first and second limit switches (34)(35) detect a movable limit by which the two side support members (12)(12) are stopped. The position switch (36) detects the soft support position of the members (12) (12) within such movable limit. As shown in FIG. 2, thus-formed position detector (32) is located at a proper position to monitor the movements of the side support members (12)(12).

The first and second limit switches (34)(35) are preferably a self-return, push type of switch which detects a limit for the open position and a limit for the hard position. With this, if the side support members (12)(12) reach the hard support position, the first limit switch (34) is turned off, whereas if they reach the open position, the second limit switch (35) is then turned off.

Accordingly, let us assume for instance that, with the hard mode being selected by selection switch (24), the side support member (12) is moved; from the open position and reaches the hard support position, turning off the first limit switch (34). Then, supply of current to the relay (RL1) is blocked, thereby energizing that relay to switch over the relay contact (RL1a) to immediately stop the drive of motor (14). Thus, the side support members (12)(12) are located at the hard support position. Likewise, if the side support members (12)(12) return to the open position, the second limit switch (34) is turned off, and the corresponding relay (RL2) is denenergized to change over the relay contact (RL2a) to stop the drive of motor (14), whereupon the support members (12) are located at the open position.

With this limiting effect, the side support members (12)(12) are insured to stop at the respective open and hard support positions by means of the first and second limit switches (34)(35), and the movable range of the members (12)(12) can be set precisely.

The position switch (36) illustrated is a photosensor, which is connected with the CPU (18). Briefly stated, the photo-sensitive switch (36) detects the soft support position of the side support members (12)(12), sensitive to a light emitted from a light source (not shown) at that position when they reach there, although not shown clearly. For instance, with the soft mode being selected by the selection switch (24), upon the side support members (12)(12) reaching the soft support position, the position switch (36) senses the light from light source and sends a detection signal to the CPU (18). Then, the CPU (18) activates the relay drive device (30) to deenergize the relay (RL1), changing over the relay contact (RL1a) to stop the drive of motor (14). Hence, the side support members are located at the soft support position.

The above-described limit switches and position switch are not limited to those described above, but instead thereof other suitable switches may be employed.

As understandable from FIGS. 1 and 2, the CPU (18) is connected with a positive pole of a battery through an ignition switch (38). Thus, the ignition switch (38) forms a main switch for the present side support control device (10), and turning on the switch (38) permits supply of voltage from the battery to the CPU (18).

Designation (40) denotes a resistance for reducing the voltage supplied from the battery, which is connected to the relay contact points matable with the relay contacts (RL1a, RL2a). As can be seen from FIG. 1, changing over of the relay contact (R12a) to one of such relay contact points causes the motor (14) to be driven in reverse direction, but the presence of the resistance (40) reduces the voltage to the motor (14), thereby lowering the rotation speed thereof. Therefore, the side support members (12)(12) are moved at a low speed from one of the soft and hard support positions to the open position, whereupon an occupant on the seat can enjoy slow motion of the side support portion of the seat to the open position. On the other hand, changing over the relay contact (RL1a) to the other of the foregoing relay contact points causes the motor (14) to be driven in a normal direction. In this instance, a rated voltage is directly supplied to the motor (14), so that the motor (14) is driven at high rotation speed to move the side support members (12)(12) quickly from the open position to one of the soft or hard support positions. This effectively causes rapid support for the occupant's upper body part when an excessive lateral acceleration occurs during driven on a curved road.

Designation (42) denotes an over-current detector resistance for detecting an over-current flowing in the motor (14), and the resistance (42) is connected in series with the motor (14) while being connected with the CPU (18) via an over-current detector circuit (44). The over-current detector circuit (44) effects a comparison between the terminal voltage of the resistance (42) and a set value preset in the circuit (44). Therefore, if the movement of side support members (12)(12) are blocked or forcibly stopped by a mechanical interference with other fittings or things adjacent to the members, the motor (14) is forcibly stopped, resulting in an overload state, which means to raise a torque thereof and thus the terminal voltage of the over-current detector resistance (42) is increased. Then, when the increased voltage reaches the set value, the over-current detector circuit (44) detects as such to send a detection signal to the CPU (18), which then deenergizes corresponding one of the relays (RL1)(RL2) to change over the associated one of relay contacts (RLa)(RLb), causing the motor (14) to be stopped. In that way, a mechanical interference to the side support members (12), which forcibly hinders drive of motor (14), will immediately stop the motor (14), thereby protecting it against overheated or damages.

Now, with the above-constructed device, a method for controlling the side support members (12)(12) will be described, by referring to FIGS. 4 through 6.

Figure 4:
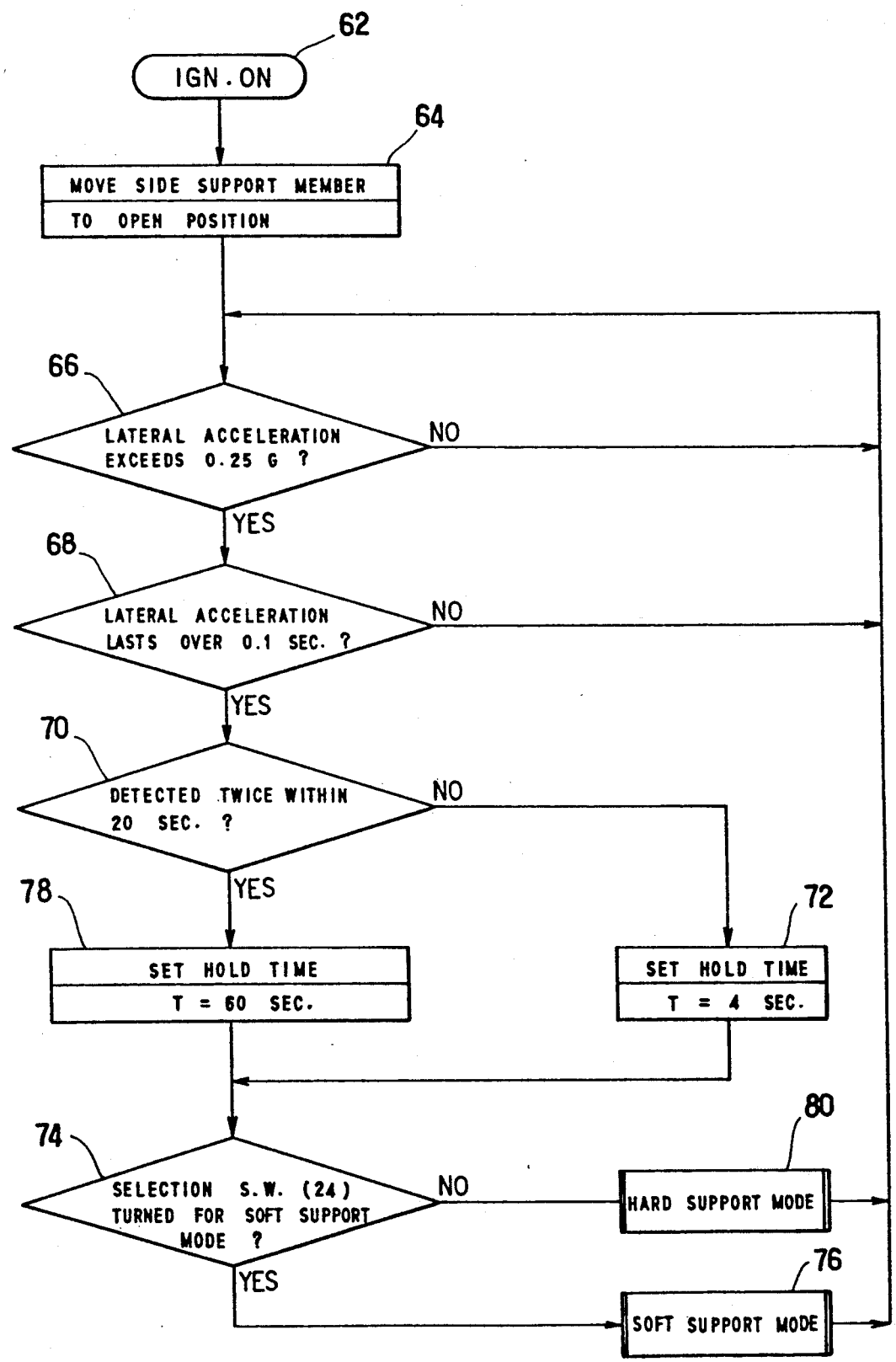
FIG. 4 is a flow chart showing a main routine for operational procedures in the present invention.

Firstly, looking at FIG. 4, there is illustrated a main routine for side support control. According thereto, at a block (62), the ignition switch (38) (of automobile) is turned on. Normally, the side support members (12)(12) are located at the open position, allowing entry and exit of an occupant into and from the automobile. However, if the members (12)(12) are located at the above-defined support position, the step flow starts, as indicated by the next block (64), with an instruction to move the side support members (12)(12) to the open position by driving the motor (14). It is noted here that in the case of the members (12)(12) being at the open position, the second limit switch (35) is in off state, whereupon the motor (14) is not driven.

Next, during driving the automobile, at the block (66), it is determined whether a lateral acceleration exceeding over 0.25 G occurs, or not. If a lateral acceleration applied to the automobile does not reach such standard degree, 0.25 G, the "NO" is decided, thus leaving the side support members (12)(12) at non-moved state.

If the lateral acceleration exceeds over 0.25 G, with the automobile running on a curved road, the mercury switch or inclination sensitive switch (16) is turned "on", giving "YES" decision at that block (66). Then, at (68), whether or not such over 0.25 G lateral acceleration lasts over the standard time, 0.1 sec., is determined. If that lateral acceleration is terminated in less than 0.1 sec., "NO" is decided at the block (68), and the side support members (12)(12) remain unmoved. If, however, the acceleration over 0.25 G lasts over 0.1 sec., the block (68) answers "YES", leading the step to the next block (70), determining whether such lateral acceleration occurs twice within 20 sec. from its first occurrence.

At the block (70), normally, if a first occurrence of lateral acceleration over 0.25 G is detected by the switch (16), a "NO" decision is made there immediately, leading the step flow to a block (72) wherein a short hold time is set, namely, 4 sec. Then, the step proceeds to determination at block (74) as to whether the soft mode is selected by the selection switch (24), or not. In this respect, assuming that the automobile is running on a city road, with the selection switch (24) being turned on for the soft mode, then the block (74) answers "YES", whereupon the step is led to a sub routine for soft mode (76) and subsequent processes are carried out along steps in the soft mode sub routines.

Figure 5:
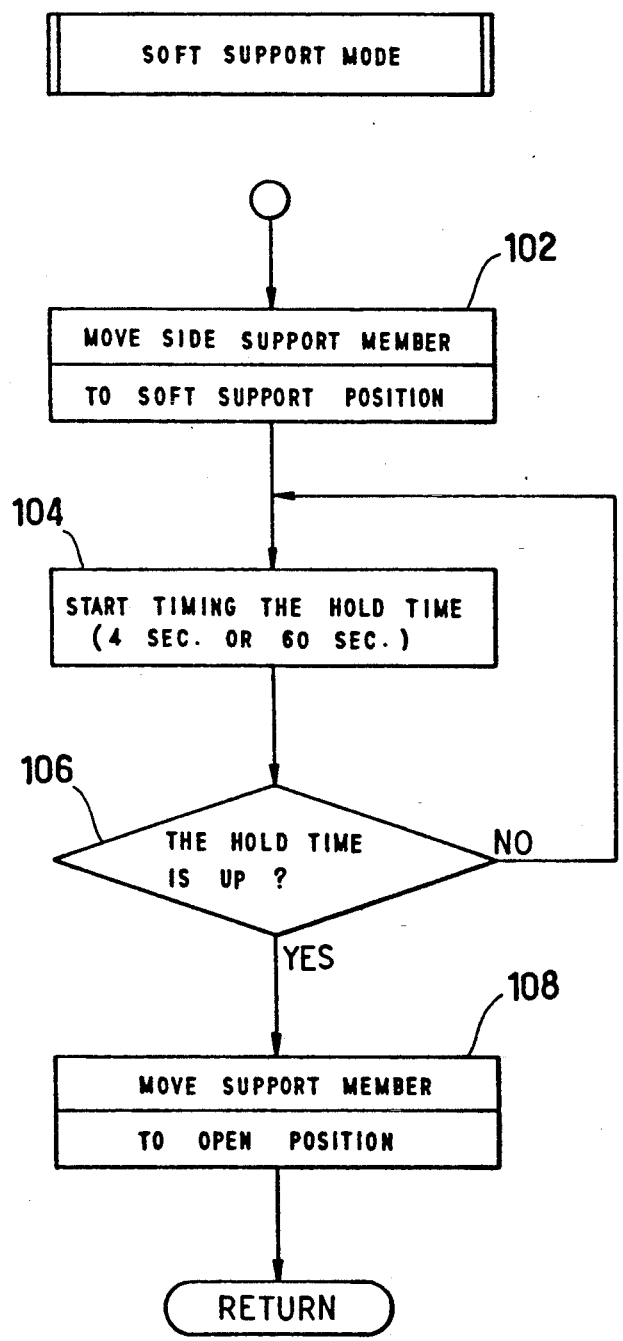
FIG. 5 is a flow chart showing a sub routine for a soft support mode.
Figure 6:
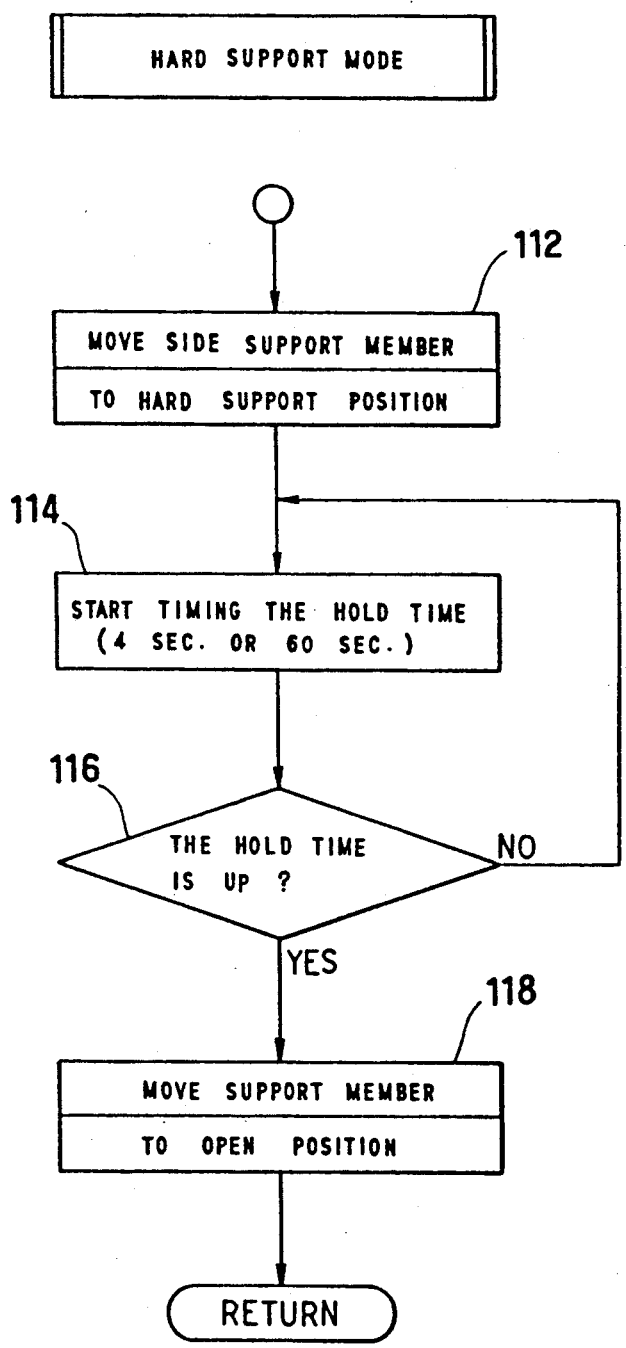
FIG. 6 is a flow chart showing a sub routine for a hard support mode.

FIG. 5 shows the soft mode sub routine (76) in detail. According thereto, since the motor (14) is driven in normal direction at a high rotation speed, causing rapid movement of the side support members (12)(12) to the soft support position, as indicated at block (102), a timer (not shown) counts the above-set 4 seconds of hold time, at (104). The step is then led to determination at (106) as to whether the 4-sec. hold time has lapsed, or not. At this stage, during such hold time, instruction in the CPU (18) repeatedly indicates a "NO" signal until the 4-sec. time period is over, to withhold decision. Then, after lapse of the hold time, "YES" is decided at the block (106), so that, at block (108), instruction is given to cause the motor (14) to be driven in reverse direction at a low rotation speed, thereby moving the side support members (12)(12) slowly to the open position. Thereafter, the step flow is returned to the main routine in FIG. 4.

Turning now to the block (70) in FIG. 4, it is assumed that a lateral acceleration occurs in excess of 0.25 G and 0.1 sec., with "YES" decision through the blocks (66)(68), and successively, following such first occurrence, another second occurrence of same degree of lateral acceleration happens within 20 sec., due to the automobile running on a winding road with multiple curved areas for instance. In this case, the block (70) gives "YES" decision. Then, the step turns to a block (78) in which a long hold time is set as 60 sec., as opposed to the foregoing short hold time of 4 sec.

From the block (78), decision is to be made at subsequent block (74) for whether the selection switch (24) is turned on for soft mode or hard mode.

If the block (74) answers "YES" for its question on the soft mode section, the step flow is then led to the soft mode sub routine (76) as in FIG. 5, in which the motor (14) is driven at high rotation speed to quickly move the side support members (12)(12) to the soft support position at (102), then at (104), the timer starts to count the 60-sec. hold time, and if such hold time has lapsed, "YES" is answered at (106), causing the motor (14) to be driven at low rotation speed to slowly move the side support members (12)(12) to the open position at (108), after which, the step is returned to the main routine in FIG. 4.

If the block (74) answers "NO", the step is led to the hard mode sub routine (80). FIG. 6 shows in detail the hard mode sub routine (80). According thereto, the motor (14) is driven in normal direction at high rotation speed, causing rapid movement of the side support members (12)(12) to the hard support position, as indicated at block (112), and a timer starts to count the 4-sec. or 60-sec. hold time set in the block (70) of the main routine in FIG. 4, at (114). Then, at (116), a determination is made on whether such hold time has lapsed, or not. If the hold time lapses, "YES" is decided there, leading the step to next block (118) wherein the motor (14) is instructed to drive at low rotation speed in reverse direction, thereby causing slow movement of the side support members (12)(12) from the hard support position to the open position. The step flow is returned to the main routine in FIG. 4.

From the descriptions above, according to the side support control method in the present invention, it is seen that, where excessive lateral accelerations occur twice (i.e. over 0.25 G degree and lasting over 0.1 sec.), a second occurrence thereof is detected from the first one in terms of whether the former happens within 20 sec. from the latter, or not, and if the second occurrence is detected within 20 sec. from the first one, then the short hold time (i.e. 4 sec.) is automatically changed to the long hold time (i.e. 60 sec.), to thereby withhold unpleasant repetition of opening closing motions of side support members (12)(12) for repeated occurrences of sharp curves driven by the automobile at many curved roads. In other words, assuming for example that the automobile runs in a rolling way on a sinuously curved road in a mountainous area, the side support members (12)(12) remain at either of the soft or hard positions to keep supporting both sides of an occupant on the seat, by virtue of the hold time being changed from short period to long period, whereby the occupant is supported stably in the seat during driving on such winding road with many curved areas, instead of repeating release/support motions of the side support members along each curved area. The occupant therefore enjoys driving, without getting nervous due to unstable supporting of the side support of seat.

Further, in the case that such excessive lateral acceleration occurs only one time and is detected so within 20 sec., the 4-sec. hold time insures that the side support members (12)(12) support the occupant's upper body part for sufficiently preventing against dislocation for safety.

The slow movement of the side support members (12)(12) from the side support position to the open position gives a pleasing or peace of mind psychological state to the occupant on seat. By contrast, the rapid movement of them from the open position to the side support position is effective for quick support to the occupant against his or her uneasy wobbling movement at the upper body part, during driving on a curved road.

The side support control device (10) in the present invention is much simplified in construction for executing the above control procedures, and permits selective choice between the soft support mode and hard support mode by operation of the selection switch (24), whereby the occupant freely selects one of the two modes to support his or her upper body part securely or loosely, depending on the road conditions.

While having described the present invention thus far, it should be understood that the invention is not limited to the illustrated embodiments, but other various modifications, alterations and additions may be possible without departing from the spirits and scope of the appended claims. For example, the detection in the embodiment above is directed to lateral acceleration, but may be directed to vertical and fore-and-aft accelerations applied to the automobile, so that the side support members (12)(12) support the occupant's upper body part when the car runs on a rough road or in a sudden deceleration thereof to help prevent throwing the occupant from the seat. The soft and hard support positions defined as above may be altered to various other positions and be stored in memory for individual occupants on the seat. The side support control device (10) may be applied to the seat cushion (26) for effecting a thigh support control similarly to the foregoing control procedures. The detection for two occurrences of acceleration within 20 sec. may be altered to the one for detecting three-time or four-time occurrences thereof to change the hold time. The values set above, i.e. 0.25 G, 0.1 sec., 20 sec and so forth may be altered to other desired values, and should not be limitative.

What is claimed is:

1. A method for controlling a side support in a powered seat, wherein a motor is controlled in its drive, depending on a running condition of a vehicle having said powered seat therein so as to cause a side support means in said seat to be moved between support position and open position, said support position being defined at a position for supporting an occupant sitting on said seat against poor seating posture, and said open position being defined at a position away from said occupant, said method comprising the steps of:
   presetting and storing in memory at least a short hold time and a long hold time, each being for holding in an unmoved state said side support means, respectively, for a short period and a long period;
   detecting an acceleration applied to said vehicle;
   determining whether said acceleration exceeds over a predetermined standard degree or not, and further determining whether said acceleration lasts over a predetermined standard time, or not;
   causing said side support means, if said acceleration exceeds over said standard degree and lasts over said standard time, to be moved towards said support position;
   stopping and holding said side support means at said support position until said short hold time lapses;
   detecting plural intermittent occurrences of said acceleration each exceeding over said standard degree and lasting over said standard time;
   determining whether said plural intermittent occurrences of said acceleration detected happen at a number of times within a predetermined time, or not; and
   changing said short hold time, if said plural intermittent occurrences of said acceleration happen at said number of times within said predetermined time, into said long hold time.

2. The method as defined in claim 1, wherein said method further includes the steps of:
   causing said motor to be driven at a high rotation speed so as to cause a rapid movement of said side support means from said open position to said support position; and
   causing said motor to be driven at a low rotation speed so as to cause a slow movement of said side support means from said support position to said open position.

3. The method as defined in claim 1, wherein said method further includes the steps of:
   dividing said support position into at least a soft support position and a hard support position, said soft support position being defined at a position for supporting said occupant softly and said hard position being defined at a position for supporting said occupant hardly, more positively than said soft support position; and
   permitting said side support means to be selectively moved to one of said soft and hard support positions by operation of a switch means.

4. The method as defined in claim 1, wherein said acceleration is a lateral acceleration which is applied to said vehicle in its width-wise direction when said vehicle runs on a curved road, and wherein said side support means comprises a pair of side support members arranged to be movable toward each other at said support position and away from each other at said open position.

5. A device for controlling a side support in a powered seat of a vehicle, comprising:
   a side support means movable between a support position and an open position, wherein said support position is defined at a position for support an occupant sitting on said seat against poor seating posture and said open position is defined at a position away from said occupant;
   a motor for causing said side support means to be moved between said support and open positions;
   an acceleration detecting means for detecting an acceleration of said vehicle exceeding over a standard degree, said acceleration being applied to said seat;
   a central processing unit which stores in memory a data for a short hold time and a data for a long hold time, separately, in a predetermined program, wherein said short and long hold times are for holding in unmoved state said side support means, respectively, for a short period and for a long period, and which processes data inputted from said acceleration detecting means, according to said predetermined program;
   a time detecting means for detecting that said acceleration over said standard degree lasts over a standard time;
   said central processing unit being so programmed, according to said predetermined program, that, when said acceleration detecting means and said time detecting means detect that said acceleration exceeds over said standard degree and lasts over said standard time, said motor is instructed to drive so as to cause said side support means to move and stop at said support position, and then said short hold time is selected to cause said motor to be in a stopped state for said short period, thereby holding said side support means at said support position for said short period; and said central processing unit being further so programmed, according to said predetermined program, as to determine whether, within a predetermined time, there happen plural intermittent occurrences of said acceleration, each exceeding over said standard degree and lasting over said standard time, or not, wherein if said plural intermittent occurrences of said acceleration is detected within said predetermined time, then said central processing unit changes said short hold time to said long hold time.

6. The device as defined in claim 5, wherein said device further includes an electric voltage changing means for causing said motor to be driven at a high rotation speed or at a low rotation speed, such that said motor is driven at said high rotation speed to cause a rapid movement of said side support means from said open position to said support position, whereas said motor is driven at said low rotation speed to cause a slow movement of said side support means from said support position to said open position.

7. The device as defined in claim 5, wherein said side support means comprises a pair of side support members arranged to be movable toward each other to said support position and away from each other to said open position, and wherein said pair of side support members are disposed in respective both sides of a seat back of said seat.

8. The device as defined in claim 5, wherein said acceleration is a lateral acceleration which is applied to said seat in its width-wise direction when said vehicle runs on a curved road, wherein said acceleration detecting means comprises a mercury switch which detects said lateral acceleration to exceed over said standard degree and sends a detection signal to said central processing unit, wherein said time detecting means comprises a timer which detects said lateral acceleration to last over said standard time and sends a detection signal to said central processing unit.

9. The device as defined in claim 5, wherein said standard degree is 0.25 G in gravity unit and said standard time is 0.1 sec.

10. The device as defined in claim 5, wherein said central processing unit is so programmed as to determine whether, within 20 sec., said plural intermittent occurrences of acceleration happen, or not.

11. The device as defined in claim 5, wherein said short time is 4 sec. and said long hold time is 60 sec.

12. The device as defined in claim 5, wherein said device further comprises:

a selection switch for permitting selective movement of said side support means to one of a soft support position and a hard support position, said soft support position being for supporting said occupant loosely and said hard support position being for support said occupant securely, more positively than said soft position, and a position detecting means for detecting the position of said side support means in each of said open position, said soft support position and said hard support position.

* * * * *